J. W. MOORE.
MACHINE FOR BREAKING COTTON SEED CAKE.
APPLICATION FILED FEB. 12, 1915.
1,193,176.
Patented Aug. 1, 1916.
3 SHEETS—SHEET 1.
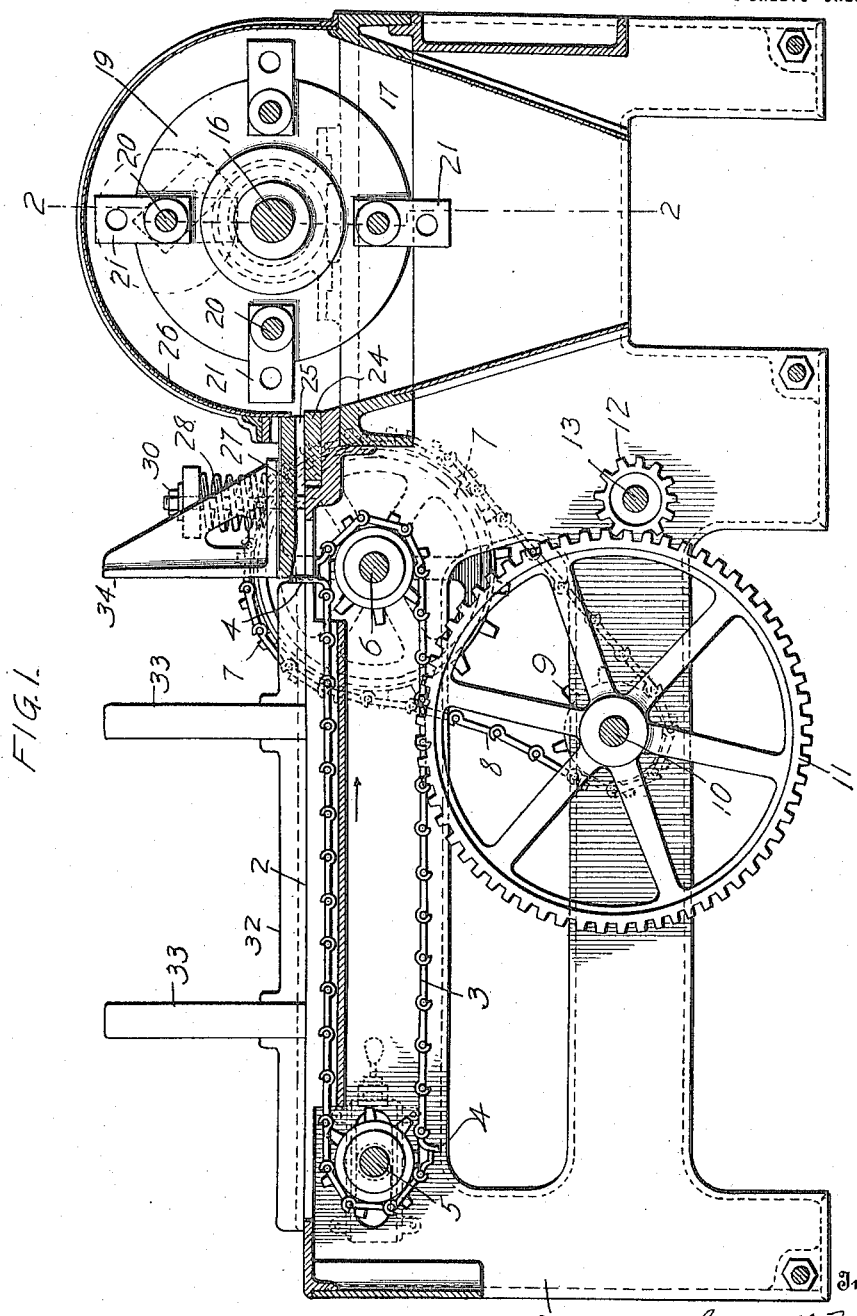
Witnesses
T. L. McCabe
H. P. Jennings
Inventor
James W. Moore
By Foster Freeman Watson & Coit
Attorneys

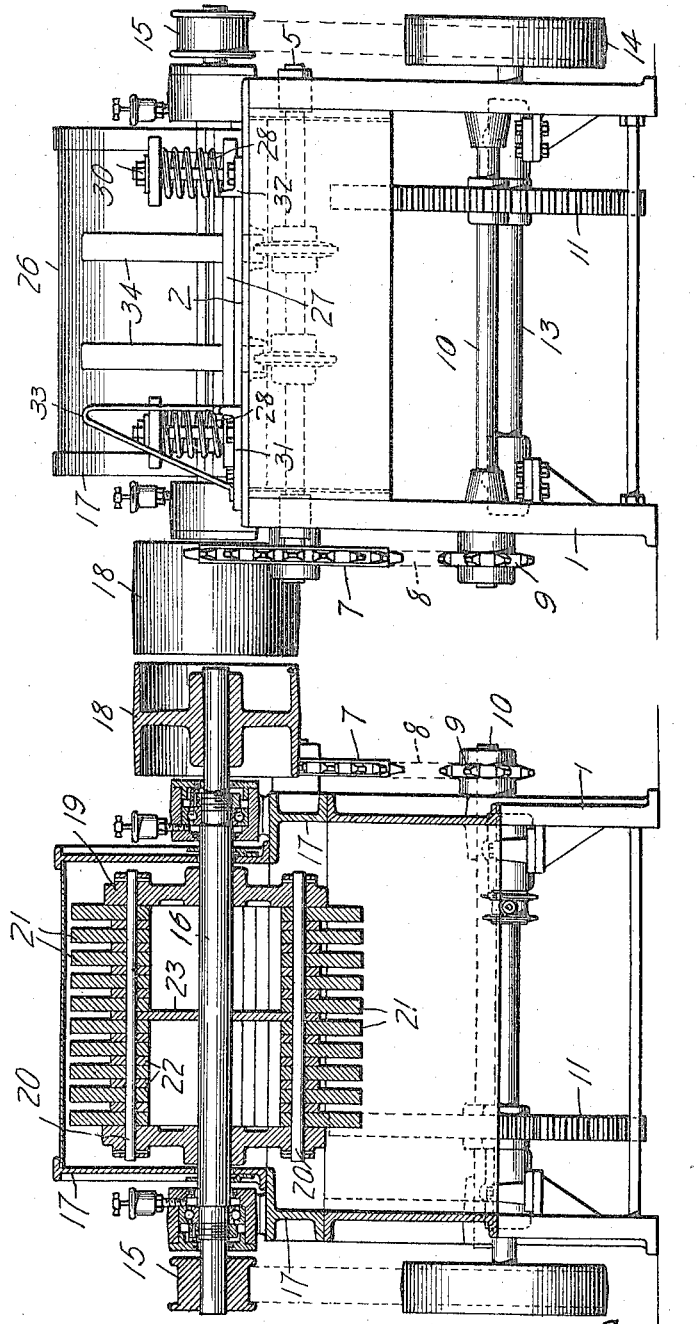

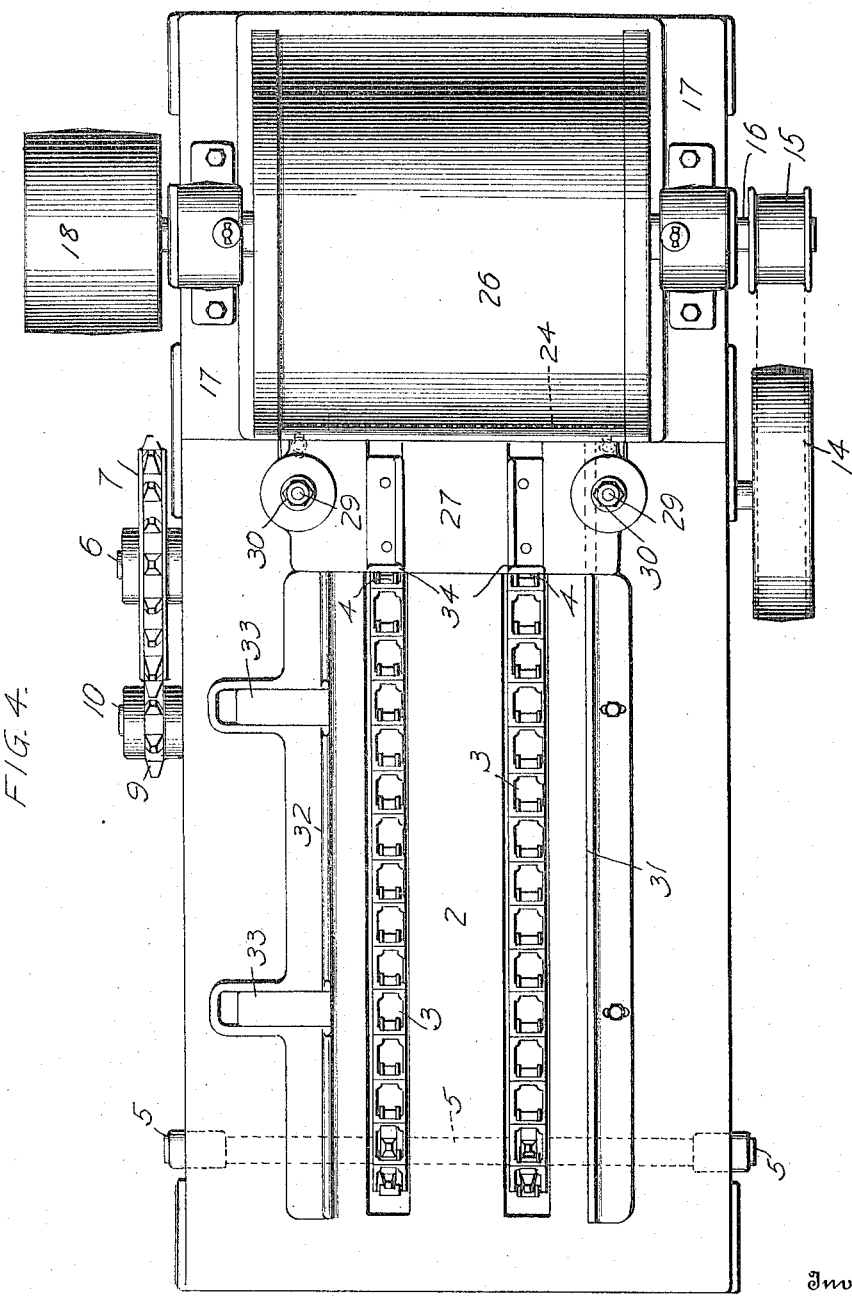

UNITED STATES PATENT OFFICE.

JAMES W. MOORE, OF EAST POINT, GEORGIA, ASSIGNOR TO ATLANTA UTILITY WORKS, OF EAST POINT, GEORGIA, A CORPORATION OF GEORGIA.

MACHINE FOR BREAKING COTTON-SEED CAKE.

1,193,176.  Specification of Letters Patent.  Patented Aug. 1, 1916.

Application filed February 12, 1915. Serial No. 7,733.

*To all whom it may concern:*

Be it known that I, JAMES W. MOORE, a citizen of the United States, residing at East Point, Fulton county, State of Georgia, have invented certain new and useful Improvements in Machines for Breaking Cotton-Seed Cake, of which the following is a specification.

The present invention relates to improvements in machines for breaking cotton seed cakes preliminary to subjecting such material to the action of grinding or pulverizing mechanism in which the material is reduced to a meal or powder form.

The object of the invention is to provide a machine which is adapted for breaking either hot or cold cakes and which will be of very simple and durable construction, requiring a minimum amount of power to operate it.

The invention will be more particularly described in connection with the accompanying drawings, in which, Figure 1 is a vertical longitudinal sectional view through a machine constructed in accordance with the invention; Fig. 2 is a transverse sectional view on the line 2—2 of Fig. 1; Fig. 3 is an end elevation; Fig. 4 is a plan.

Referring to the drawing, it will be seen that the machine includes a main frame 1 preferably of metal, which is provided with a supporting table or surface 2 upon which the cakes to be broken can be stacked.

A conveyer comprising endless chains 3 provided with pushers 4 is adapted to move the cakes longitudinally of the table 2. As shown, the chains 3 are supported by sprockets mounted on shafts 5, 6, journaled in suitable bearings in the frame 1. The upper sections of said chains pass through grooves formed in the table 2 so that only the pushing members 4 of the conveyer extend above the horizontal top surface of the table. On the shaft 6 is also secured a driving sprocket 7 which is connected by a chain 8 with a sprocket 9 on a shaft 10 journaled in the lower portion of the main frame 1. A gear 11 on the shaft 10 is actuated by a pinion 12 on a counter-shaft 13. The counter-shaft 13 extends outside of the frame 1 and is provided with a band wheel 14 adapted to be connected with a pulley 15 on the main power shaft 16 of the machine. This main shaft 16 is securely mounted in bearings on the auxiliary frame 17 which is suitably secured to the main frame beyond the discharge end of the table 2 and on said shaft is mounted the rotor or breaking means which will be hereinafter more particularly described. The shaft 16 is driven from any suitable source of power through the medium of a driving pulley 18 at one end thereof.

To the shaft 16 are fixed a pair of end plates 19 which are connected by rods or bars 20 which form the supports for the swinging hammers 21. The rods 20 extend through suitable bearings in the plates 19 and are held in position and against rotation relative to said plates by suitable cotter pins or keys extending through bosses on the plates and said rods. The hammers 21 are of rectangular form and, as previously stated, are loosely mounted on the rods 20, said hammers being arranged alternately with spacing rings 22. The rods 20 are arranged in such relation to the shaft 15 and the hammers 21 so proportioned that each of said hammers is adapted to turn about the supporting rod as a pivot through a complete cycle, as represented in Fig. 1. In the embodiment of the invention illustrated there are four rods 20 and four series of hammers 21, the rods being separated from each other and from the supporting shaft 16 so that if any hammer meets with unusual or undesirable resistance it may be caused to turn about its supporting rod in a direction opposite that in which it is carried by movement of the shaft 16 and end plates 19. When the machine is in use, the rotary support for the hammers turns at such speed that the action of centrifugal force tends to hold the hammers 21 in their outermost positions and so that they strike the portions of a cake projected beyond the discharge end of the table 2 by the endless conveyer. To compensate for unequal wear on the supporting rods 20 by the action of the hammers 21, the rods may be detached from the plates and reversed in position, by a circumferential movement so as to effect a relative movement between the bearing surfaces of the several hammers and rod, whereby the proper alinement of the hammers will be restored. The several pivot rods or bars 20 are maintained in proper relation by their engagement with the head or end plates 19 and also by an intermediate spacing plate or disk 23 which loosely surrounds the shaft 16.

Beyond the discharge end of the table 2 is arranged a removable plate or anvil 24 over which the cake to be broken passes, the breaking action taking place between the free edge of said plate and the hammers 21. As shown, this anvil or breaker plate 24 is secured in a suitable seat formed in the frame of the machine and projects into the mouth 25 of a casing which surrounds and incloses the hammers and their supporting means. The plate 24 is secured to the frame by bolts extending through elongated slots so that the plate may be adjusted toward or from the interior of the casing 26 so that the size of the fragments or pieces produced by the machine may be regulated as desired. As shown, the plate 24 is arranged in a seat or depression in the frame so that its top surface is in the same plane as the top surface of the table 2 and means are provided for exerting suitable pressure upon the cake resting on said plate and the adjacent end of the table so that vibration of the body of the cake is prevented and only the portion of the cake projecting beyond said plate can be carried into the casing by the action of the hammers.

The particular form of pressure device shown comprises a plate 27 which is of such length as to extend into the mouth 25 of the casing 26 and rearwardly therefrom to slightly beyond the plane of the axle of the conveyer drive shaft 6, the necessary pressure being exerted upon said plate by coiled springs 28 arranged about rods 29 rising from the frame of the machine. The springs 28 are positioned between the top surface of the plate 27 and suitable nuts 30 on the bolts 29. At its rearward end the plate 27 is inclined slightly upward so that it provides a slightly tapering inlet for the cakes and the pressure exerted by the springs 28 is such that said plate will permit the passage of cakes of different thickness.

The table 2 is preferably provided with longitudinally extending guides 31, 32, the latter having upwardly projecting side members 33 against which the side edges of a series of cakes stacked upon the table will rest. Upwardly extending guards 34 limit the forward movement of all of the cakes in a stack except the lowest one which is directly engaged by the endless conveyer.

In operation the main shaft 16 will be driven at a high speed and the gearing interposed between such shaft and the endless conveyer causes the latter to feed a series of cakes successively over the table 2 and anvil plate 24 at the desired speed. The rapidly revolving hammers 21 striking the portion of the cake projecting into the casing 26 break the same into pieces of substantially uniform size which fall downwardly into a suitable receptacle arranged below the casing, inclined cant boards 35 being provided to direct the material into a suitable conveyer or receptacle, not shown. If any hammer meets with unusual resistance, as by striking any foreign material contained in the cake, for example a bolt or other hard substance, there is no danger of the hammer being broken as it can turn in a reverse direction to that in which it is moving under the action of the shaft 16 and as shown describe a complete circle about its pivot or supporting rod 20 without coming in contact with any part of the mechanism.

The casing 26 is detachably connected with the auxiliary frame 17 and so incloses the breaking means as to prevent the escape of dust and fine particles but can be readily removed if it is desired to obtain access to the hammers or their supporting parts. It will be seen that the casing and all parts therein contained are supported directly on the auxiliary frame 17 which permits of the bearings for the main power shaft 16 being accurately adjusted before the auxiliary frame is positioned on the main frame and by disconnecting the two frames the main power devices and breaker mechanism can be bodily detached from the machine. The end plates 19 of the rotor being relatively heavy the entire device has the general action of a fly wheel enabling the hammers to exert a maximum amount of striking force with a minimum application of power. The machine avoids entirely the necessity for having any baffles, screens or any means which may become clogged and tend to retard the progress of the material being treated and it will be evident that either hot or cold cakes may be rapidly broken. Any of the hammers may be easily removed and replaced or reversed in position on their supporting rods so that either edge or end thereof is operative.

The machine may be arranged in connection with any of the ordinary forms of automatic trimming mechanisms, the cakes being delivered from such a trimming machine directly onto the table 2 and a minimum amount of care and attendance is required as all of the parts operate automatically. The anvil block 24 may be readily adjusted to or from the path of the hammers or reversed in its seat so that if one face thereof becomes worn it is not necessarily discarded.

Having thus described the invention, what is claimed and desired to be secured by Letters Patent is:

1. A machine for treating cotton seed cake, preliminary to grinding or pulverizing it, comprising in combination a substantially horizontal support adapted to receive a series of superposed cakes, a rotor arranged beyond one end of said support and including a plurality of series of peripherally projecting hammers, a removable plate or anvil arranged between the cake support and rotor, means for successively feeding the bottom cake of the stack on the support across the anvil into the path of the hammers, and means for holding the body of the cake being broken in close contact with the anvil.

2. A machine for treating cotton seed cake, preliminary to grinding or pulverizing it, comprising in combination a main frame providing a substantially horizontal support adapted to receive a series of superposed cakes, a supplemental frame mounted on and bodily detachable from the main frame beyond one end of the support for the stack or pile of cakes, a rotor mounted in bearings carried by the supplemental frame and including a plurality of series of peripherally projecting hammers, a casing extending over the rotor and having an inlet positioned to receive the lowest cake in the stack when moved from its support toward the rotor, and means for successively feeding the bottom cake of the stack on the support through said inlet.

In testimony whereof I affix my signature in presence of two witnesses.

JAMES W. MOORE.

Witnesses:
W. C. Hudson,
J. V. Rogers.

Copies of this patent may be obtained for five cents each, by addressing the "Commissioner of Patents. Washington, D. C."